United States Patent
Rinne et al.

(10) Patent No.: US 6,222,747 B1
(45) Date of Patent: Apr. 24, 2001

(54) POST REGULATION CONTROL CIRCUIT FOR A SWITCH MODE POWER SUPPLY WITH MULTIPLE OUTPUTS

(75) Inventors: Karl Rinne, Waterford; Liam O Suilleabhain, Cork, both of (IE)

(73) Assignee: Artesyn Technologies, Youghal (IE)

( * ) Notice: Subject to any disclaimer, the term of this patent is extended or adjusted under 35 U.S.C. 154(b) by 0 days.

(21) Appl. No.: 09/481,403

(22) Filed: Jan. 12, 2000

(30) Foreign Application Priority Data

Jan. 12, 1999 (IE) .......................................... S990019

(51) Int. Cl.$^7$ ...................................................... H02M 7/04
(52) U.S. Cl. ................................................. 363/89; 307/39
(58) Field of Search .............................. 363/44, 89, 90, 363/125; 307/39

(56) References Cited

U.S. PATENT DOCUMENTS

| | | | |
|---|---|---|---|
| 5,003,454 | * 3/1991 | Bruning | 363/89 |
| 5,005,112 | 4/1991 | Kuriyama | 363/21 |
| 5,428,267 | 6/1995 | Peil | 315/224 |
| 5,541,828 | 7/1996 | Rozman | 363/21 |
| 5,615,093 | 3/1997 | Nalbant | 363/25 |
| 5,862,042 | 1/1999 | Jiang | 363/17 |
| 6,091,233 | * 7/2000 | Hwang et al. | 323/222 |

OTHER PUBLICATIONS

Cherry Semiconductor Corporation, Product No. CS 5101, 1995 No Month pp. 1–7.

Linfinity Microelectronics Inc., Datasheet LX 1570/1571, 1995 No Month, 6–59 to 6–69.

Allied Signal Inc. R697/1.5M "Design of High Frequency Mag Amp Regulators using Metglas" 1977 No Month p. 1–21.

* cited by examiner

Primary Examiner—Shawn Riley
(74) Attorney, Agent, or Firm—Jacobson, Price, Holman & Stern PLLC

(57) ABSTRACT

A post regulation control circuit (12) is provided for a switch mode power (10) having multiple outputs (VoN) of the phase modulation type with trailing edge synchronization. The control circuit (12) detects the end of a power cycle and provides a signal to allow a ramp generator to operate. It operates in either voltage or current mode control.

24 Claims, 5 Drawing Sheets

POST REGULATION CONTROL CIRCUIT FOR A SWITCH MODE POWER SUPPLY WITH MULTIPLE OUTPUTS

BACKGROUND OF THE INVENTION

Field of the Invention

The present invention relates to a post regulation control circuit for a switch mode power supply (SMPS) with multiple outputs, said circuit being of the phase modulation trailing edge synchronisation type having a ramp generator and a triggering mechanism.

Generally such switch mode power supplies take electrical power from a source as an input voltage and deliver electrical power to multiple loads.

The invention is particularly directed to isolated or non-isolated single-ended or double-ended converters.

Typically they can be buck-derived isolated or non-isolated SMPS which take power from a source at a voltage Vin, and deliver power to a load, at a voltage Vo. Typically the output voltage is regulated in order to guarantee that a constant voltage is applied to the load even if the input voltage Vin or the output current Io or both vary. Often it is desirable to add one or more outputs Vo2, Vo3, and so on. Again these individual output voltages should be independently regulated.

Many proposals have been made to address this problem. For example, if the load current of the auxiliary output is relatively low a linear regulator can be used. While this approach is simple and gives excellent results in terms of output noise and dynamic performance it suffers from poor efficiency particularly if wide input voltage variations have to be accommodated.

Magnetic amplifier output regulators have been used as a means for regulating more than one output of a switching supply. They are particularly suitable for currents of 1 amp to more than 20 or 30 amps, though they have been used where tight regulation and efficiency are extremely important at lower current ratings. They are efficient in that they provide extremely precise regulation of each independent output and are simple and reliable. Closely regulating outputs can be obtained using a simple control circuit. However, the magnetic amplifiers tend to be bulky and expensive. Moreover they can be lossy particularly if the switching frequency is high. Minimum delay times do cause duty cycle losses, and reduce the maximum achievable output voltage for the auxiliary outputs. A typical magnetic amplifier and the design of such high frequency magnetic amplifier output regulators is described in an application guide produced by Allied Signal Inc. and entitled 'Design of High Frequency Mag Amp Regulators Using Metglas' (see 1977 Allied Signal Inc. R697/1.5M)

Magnetic amplifier regulators have problems in that because they have to withstand the maximum input voltages during a short circuit condition, they are effectively over-designed, typically by a factor of two which increases the cost and size of the power supply. Secondly, they are inherently leading edge modulators so that you can only approach a certain maximum duty cycle limited by the minimum delay and the magnetic BH loop characteristics of the magnetic amplifier core. This forces an increase in the size of the main transformer as well as the output inductor resulting in high overall system costs.

Alternatively, one or more buck converters can be connected to the main output Vo1 and deliver independently regulated outputs. Good results in terms of efficiency can be achieved at the expense of increased output noise at the main output Vo1. Additionally the pulsating input current into the buck stage causes a high ripple current stress of the output filter capacitor of the main output. The buck converter can be replaced by a current-fed converter with a continuous input current. The output noise problems can be solved, but new problems are introduced, for example, poor boost switch utilisation.

The noise problems at the main output mentioned above can be avoided if the auxiliary outputs are not directly derived from the main output but from the pulsating voltage at the secondary of the transformer. Regulation of the auxiliary output is achieved by phase modulation in combination with a controlled rectifier.

Various solutions to obviate the rise of a magnetic amplifier have been proposed. It is known to provide a phase modulated synchronous secondary side regulator which overcomes the propagation delay time. Such a controller is produced by Linfinity Microelectronics and is described in their data sheet LX1570/1571 Copyright ©1995 Linfinity Microelectronics Inc. A controlled forward rectifier is turned on before the start of the power cycle. Depending on the error of the output voltage of the auxiliary output, the controller forward rectifier is turned off sometimes during the power cycle. Leading-edge phase modulation between the main output and the auxiliary output is achieved. The turn-off of the controlled forward rectifier can coincide with the end of the main power cycle, and duty cycle losses can be completely avoided. A significant problem, however, is introduced to the converter. Leading-edge pulse with modulation means that at the beginning of the power cycle the primary current equals the reflected sum of the output currents. After the controlled forward rectifier is turned off the primary current drops to a value equal to the reflected main output current. This shape of the primary current is no longer compatible with primary-peak-current-mode-control (PPCMC) as the most popular SMPS control scheme. Voltage mode control or average current mode control has to be used, each with its own set of problems.

In another phase modulation approach to the problem, the post regulator control circuit ensures that the trailing edges of the power pulses into the main and auxiliary outputs are synchronised. A typical example of such an approach is a secondary side post regulator for AC/DC and DC/DC multiple output converters manufactured by Cherry Semiconductor Corporation and identified under the product No. CS5101 and described in a data sheet of the same title, copyright ©1995 Cherry Semiconductor Corporation. The post regulator control circuit ensures that the trailing edges of main and auxiliary outputs are synchronised. A ramp is generated, and triggered at the start of each power cycle. Depending on the error of the output voltage of the auxiliary output, a delay between the start of the main power cycle and the turn-on of the synchronous switch is generated. Trailing-edge phase modulation between the main output and the auxiliary output is achieved. While good efficiency figures, good regulation and low output noise can be achieved the scheme shares one disadvantage with magnetic amplifiers. Inherently there will be control circuit propagation delays between the detection of the start of the power cycle to turn-on of the controlled forward rectifier. This results in a duty cycle loss of the auxiliary output with respect to the main output. Since these propagation delays are inherent to the control circuit, and constant versus the switching frequency of the SMPS, the problem gets worse at higher switching frequencies.

Typical multiple output converters are described in U.S. Pat. Nos. 5,005,121 (Mitsubishi), 5,541,828 (AT&T) and 5,862,042 (Lucent Technologies).

There is an increasing demand for converters to supply multiple loads at different level of voltages over a large range. Typically loads do not tolerate wide variations in their supply voltages and therefore the output voltages of these converters has to be well regulated.

In this specification reference is had to trailing edge synchronisation. However, when talking about modulation people skilled in the art may refer to this as leading edge modulation. Thus, in FIG. 3 the trailing edges of Vrect1 and Vrect2 are synchronised and similarly it is correct to say their leading edges are modulated.

The present invention is directed towards providing an improved construction of a post regulation control circuit for a switch mode power supply with multiple outputs of a phase modulation type having trailing edge synchronisation, a ramp generator and a triggering mechanism.

SUMMARY OF INVENTION

According to the invention there is provided a post regulation control circuit for a switch mode power supply with multiple outputs of the phase modulation type with trailing edge synchronisation having a ramp generator and a triggering mechanism, characterised in that the end of the power cycle is detected and triggers the ramp generator. The advantage of this is though the control circuit does have inherent propagation delay times, these delays can be arranged to occur during the freewheeling period. For all practical operating duty cycles and for all practical propagation delays duty cycle losses can be eliminated, while unlike the previously described secondary side post regulator for AC/DC and DC/DC multiple output converters as manufactured by Linfinity Microelectronics Inc., the primary side current remains compatible with PPCMC.

In one embodiment of the invention a synchronous pulse generator is used to detect the end of the power cycle and trigger the ramp generator. A synchronous pulse generator is a particularly suitable way of carrying out the present invention.

Ideally the synchronous pulse generator triggers a flip-flop as well as triggering the ramp generator.

Gate signals can be provided for a control forward generator and if present for a control forward rectifier and if present for a control forward control free-wheel rectifier.

BRIEF DESCRIPTION OF THE DRAWINGS

The invention will be more clearly understood from the following description of some embodiments thereof, given by way of example only described with reference to the accompanying drawings in which.

DESCRIPTION OF THE INVENTION

Figure 1:
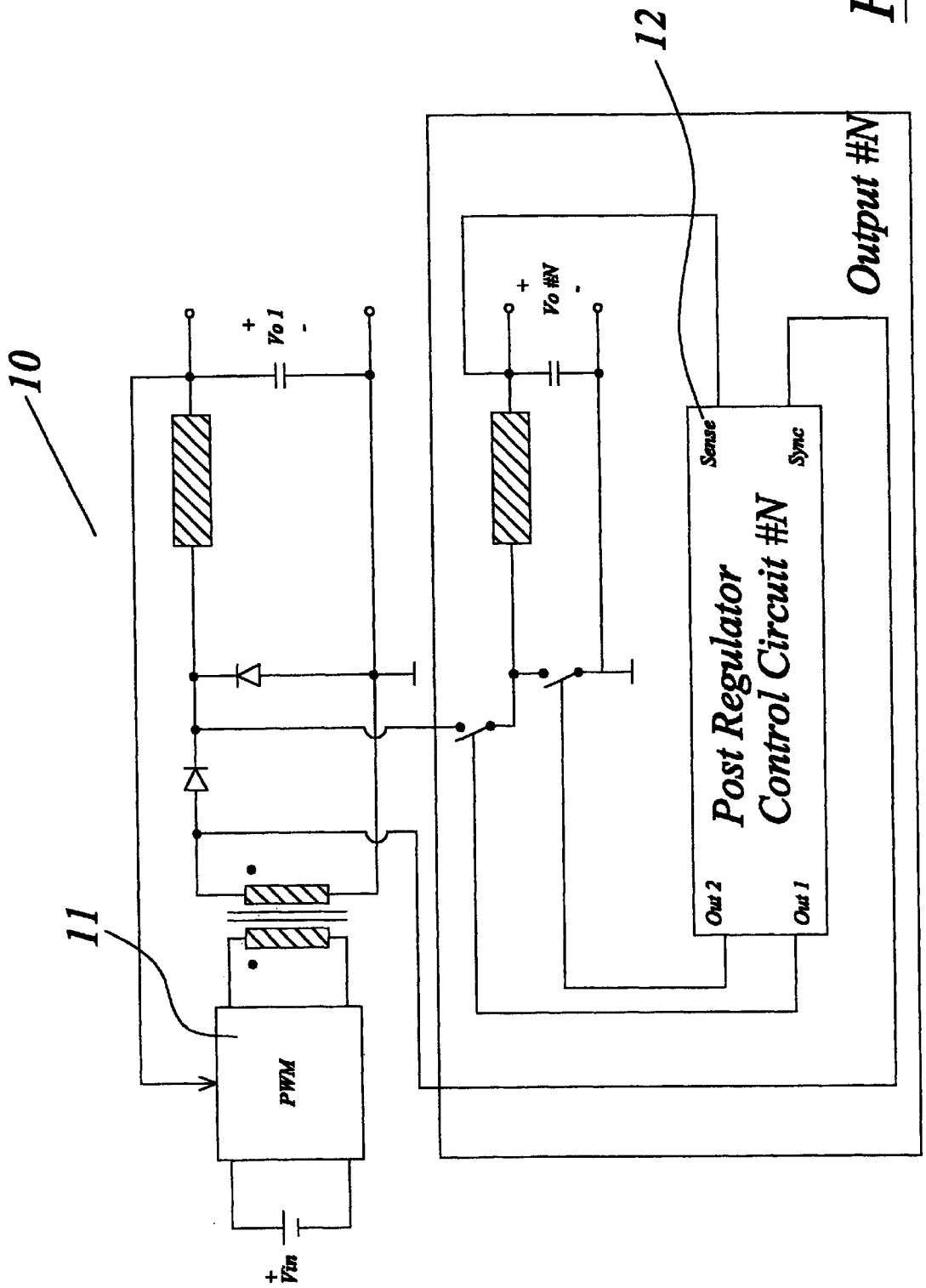
FIG. 1 is a block diagram of a converter according to the invention.
Figure 2:
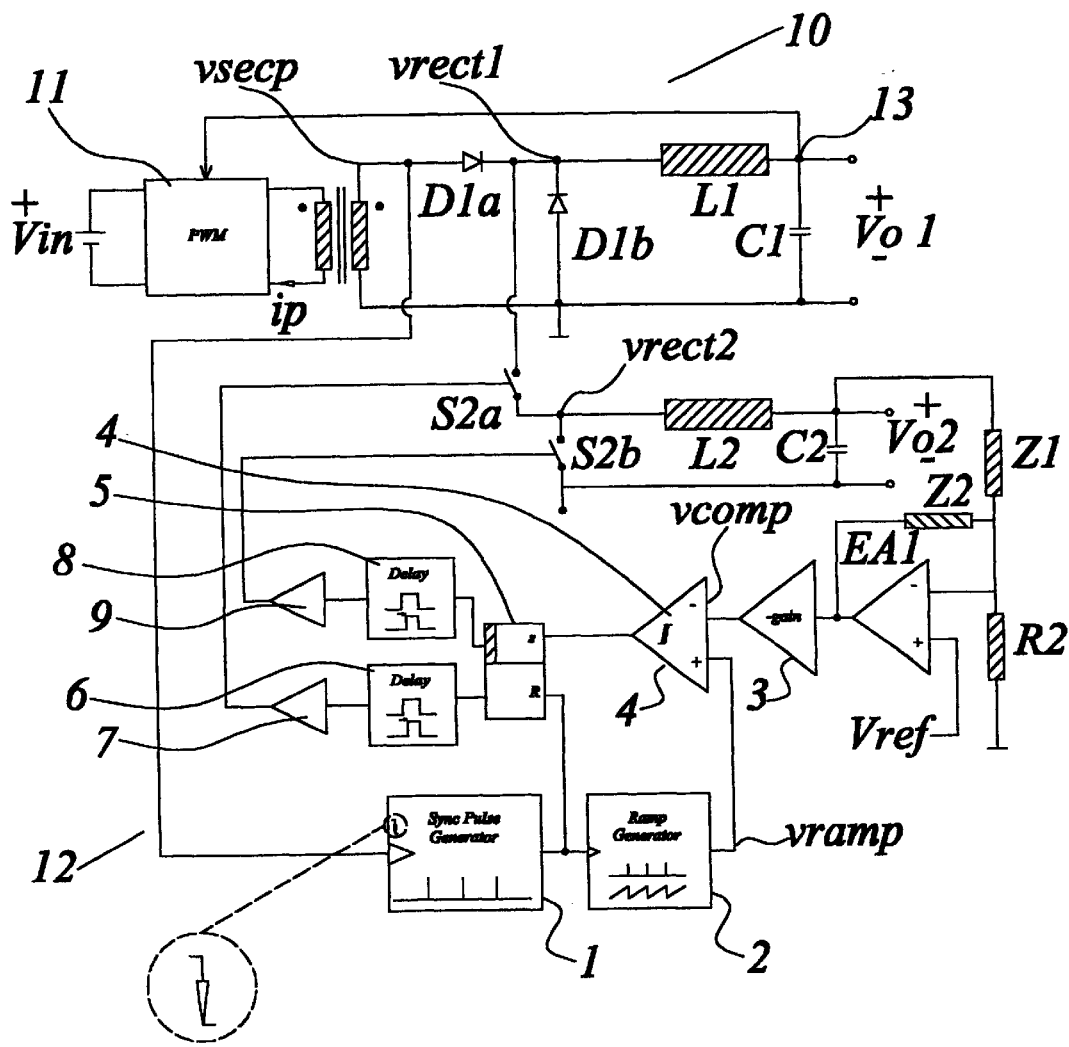
FIG. 2 is a more detailed block diagram of the converter showing only two outputs.
Figure 3:
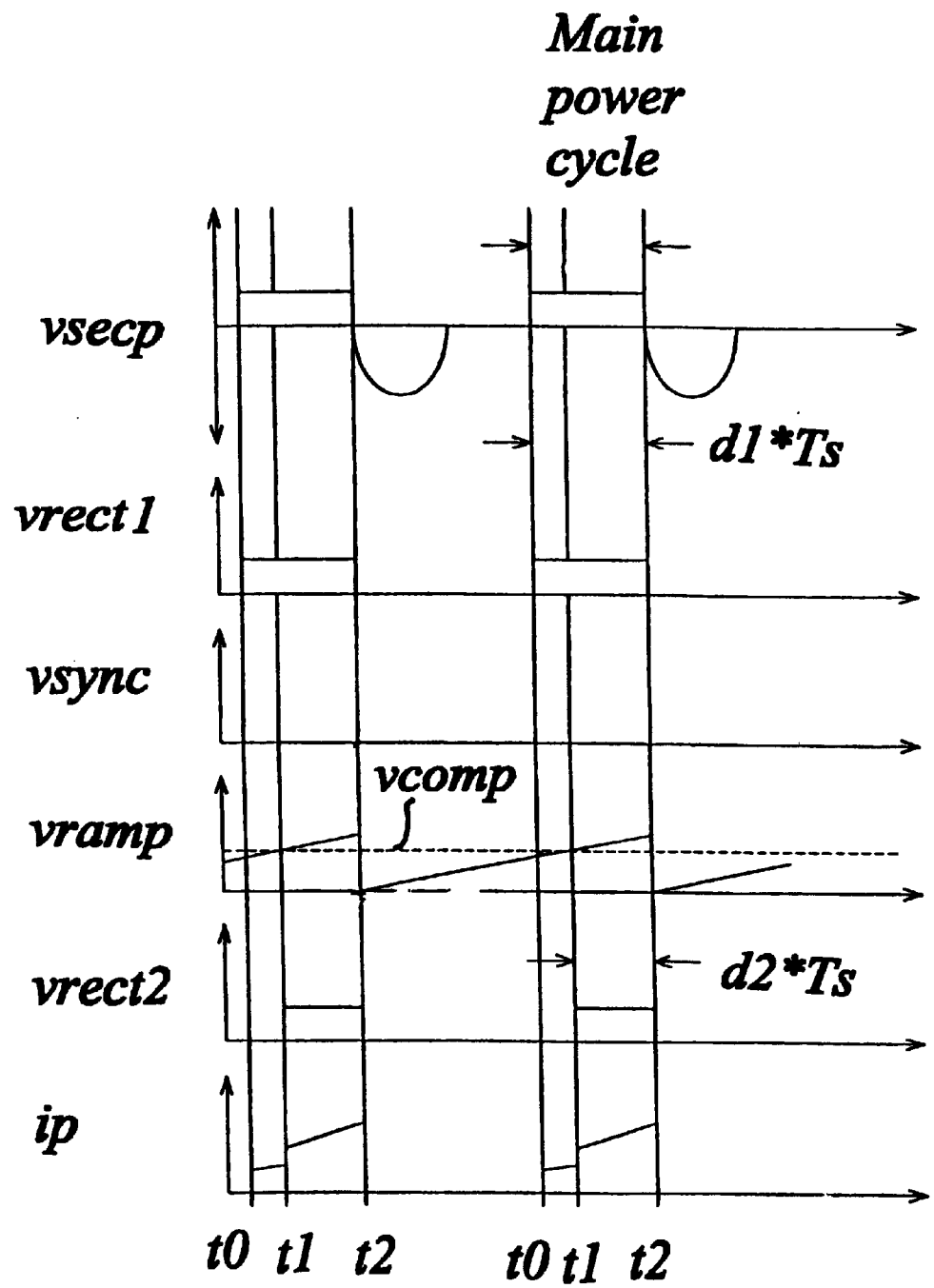
FIG. 3 shows typical waveforms for the converter of FIGS. 1 and 2.

Referring to FIGS. 1 to 3, there is illustrated in FIG. 1 a switch mode power supply. A supply transformer isolated single-ended buck converter indicated generally by the reference numeral 10 which provides a main output voltage Vo1 which is regulated by a pulse width modulator (PWM) 11 sited on the primary side of the converter 10. A plurality of auxiliary outputs, in this case three are shown, and one of the outputs is identified by the reference letter N can be derived by tapping from the secondary side of the converter 10, the output will be a pulsating voltage and it is in turn regulated by a post regulator control circuit 12.

Referring now specifically to FIGS. 2 and 3 the circuit is shown in more detail. The output of the converter 10 comprises a pair of uncontrolled rectifiers formed from diodes D1a and D1b and filtering elements L1 and C1. The main output voltage Vo1 is sensed at 13 and is fed back to the main pulse width modulator 11. The post regulator control circuit 12 comprises a synchronous pulse generator 1 feeding a ramp generator 2 which in turn feeds a comparator 4 feeding a flip-flop 5 which is also fed directly from the synchronous pulse generator 1. The flip-flop 5 feeds through two delay devices 6 and 8, drivers 7 and 9 respectively. One driver 7 feeds a controllable switch in this case a MOSFET S2a and the other driver 9 feeds a further controllable switch provided by a MOSFET S2b. Suitable filtering elements L2 and C2 are included to the auxiliary output stage. The auxiliary output stage again feeds back through an error amplifier EA1 to sense the output voltage of the auxiliary output Vo2 and to develop a signal reflecting the error of the output voltage. In this circuit the output voltage is fed from the error amplifier EA1 through an inverter 3 to the comparator 4.

In operation the output voltage Vo1 is sensed and the duty cycle is adjusted by the pulse width modulator 11 to maintain the desired level of output voltage Vo1 in a closed-loop fashion as is conventional.

The main power cycle with the duration d1*Ts spans from time point t0 to t2. The synchronous pulse generator 1 detects the end of each power cycle by detecting in this embodiment the falling edge of the voltage vsectp. It will be appreciated that the voltage vrect1 could equally well be detected. The synchronous pulse generator 1 feeds the flip-flop 5, while simultaneously triggering the ramp generator 2. As can be seen from FIG. 3 the ramp voltage vramp is reset to its initial value at the end of each power cycle and starts ramping up towards its final value preferably in a linear fashion. The flip-flop 5 feeds through the delay elements 6 and 8 to the drivers 7 and 9 to amplify the outputs of the flip-flop 5 and to provide driving signals to the switch at S2a and S2b, which in turn gives the voltage output Vo2.

As usual the error amplifier EA1 senses the output voltage Vo2 and develops a signal reflecting the error of the output voltage. In this particular embodiment the output voltage of error amplifier EA1 is low if the output voltage Vo2 is above its desired value. Inverter 3 derives a voltage vcomp as can be seen from FIG. 3 which is high if the output voltage Vo2 is above its desired value.

The output of comparator 4 will swing from low to high as soon as the ramp voltage vramp hits the compare voltage vcomp. A low-to-high transition of the output of comparator 4 will set the flip-flop 5 leading to subsequent turn-on of the forward switch S2a. As soon as the switch S2a is on the power cycle for the auxiliary output is initiated. This happens at time point t1.

It will be seen that the end of the power cycle for the auxiliary output automatically coincides with the end of the main power cycle at time point t2. The power cycle for the auxiliary output lasts for d2*Ts. It will be appreciated that depending on the error of output voltage Vo2 a variable delay spanning from t0 to t1 is introduced in a closed-loop fashion. Since the trailing edges of both power cycles coincide trailing edge synchronisation is achieved.

It will be appreciated that a significant difference with the prior art is that inherent propagation delays of the post regulator control circuit can potentially start before the arrival of the main power cycle at time point t0. In the extreme the duty cycle d2 of the auxiliary output can become equal to the duty cycle d1 of the main output. Therefore the auxiliary output voltage Vo2 can reach the value of the main output voltage Vo1 in the shown configuration.

While the ramp generator has been triggered at the end of the power cycle, it is envisaged that there could be a delay between the end of the power cycle and ramp generation. This would mean that the ramp generator would only start operating at a time someway into the freewheeling cycle. This time would be dependent on the delay introduced.

It is also envisaged that the ramp generator might supply a decaying voltage.

Any digital or analog implementation of the synchronous pulse generator is possible, for example, a MOSFET switch with resistor and capacitor components suitably arranged could be used to detect the falling edge and trigger the ramp generator.

Figure 4:
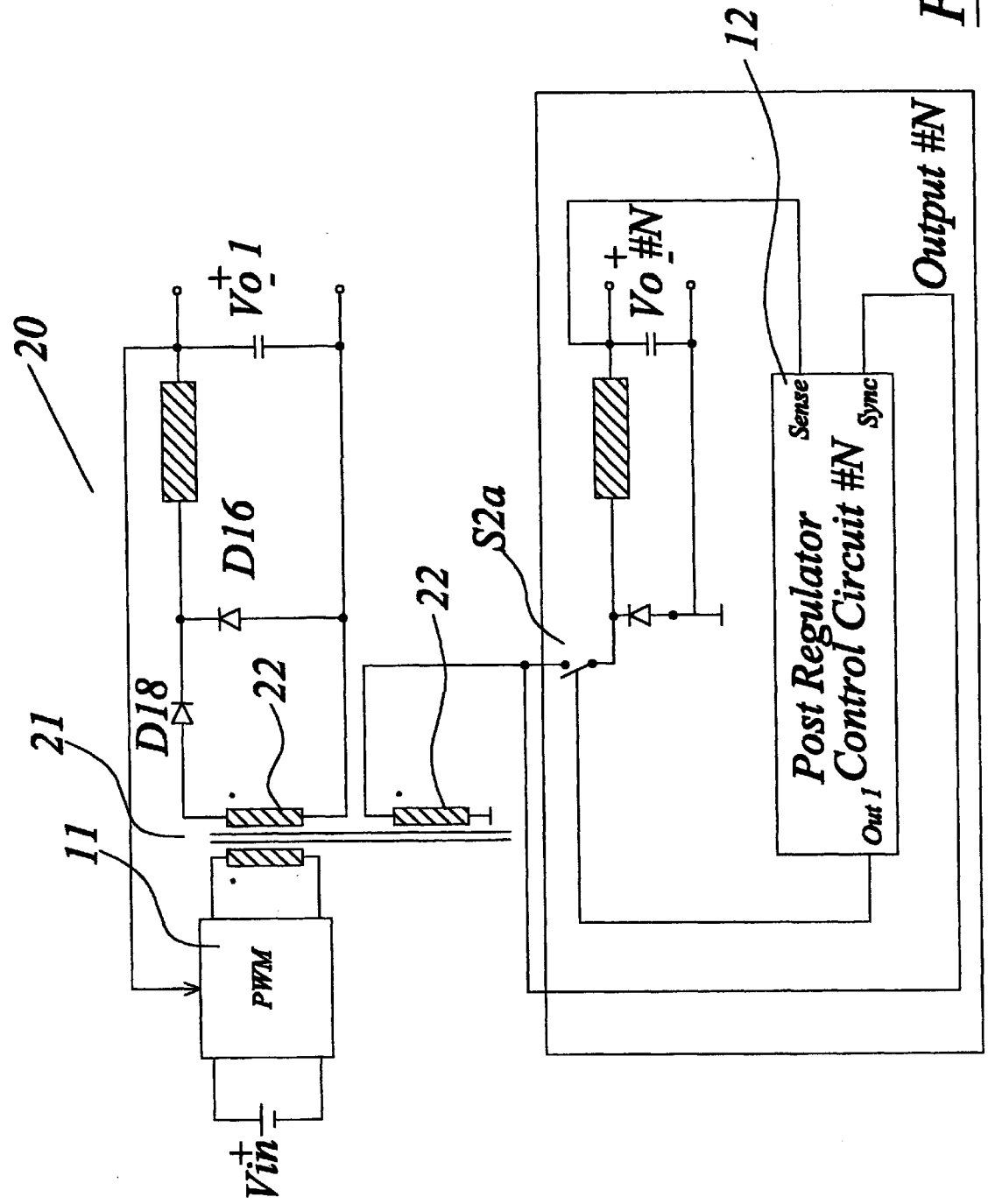
FIG. 4 is a block diagram similar to FIG. 1 of an alternate embodiment of the invention.

Referring now to FIG. 4 there is illustrated a circuit diagram of a converter indicated generally by the reference numeral 20 in which parts similar to those described with reference to the previous drawings are identified by the same reference numerals. Indeed everything in converter 20 is identical to the converter as illustrated in FIG. 1, except that there is provided a transformer indicated generally by the reference numeral 21 having a plurality of secondary coils 22, each of which is dedicated to an auxiliary output.

In this embodiment the switch S2a is a bi-directional switch which is directly connected to the secondary coil 22 of the transformer. It will be appreciated that if the switch S2a is not a bi-directional switch, for example if it is a MOSFET which cannot block a bipolar voltage an additional diode could be used in series with the switch S2a and this could be a dedicated diode, or indeed for example the diode D1a.

Figure 5:
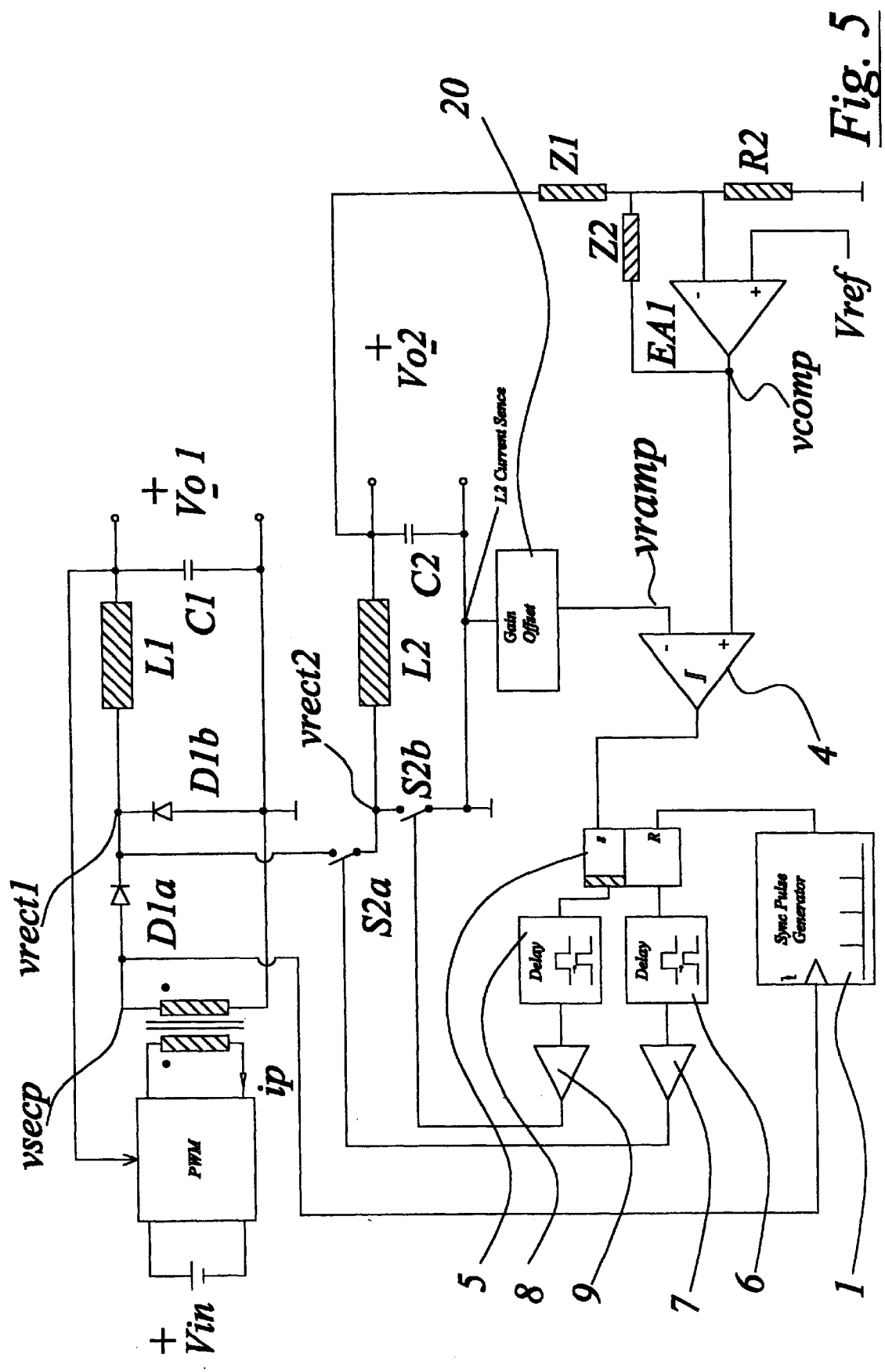
FIG. 5 is block diagram of a converter for current mode control.

Referring to FIG. 5 there is illustrated a block diagram of a converter for current mode control components similar to those previously described and identified by the same reference numerals. The ramp generation is provided by the inductor L2 which will be amplified and often can be level shifted. The inductor L2 provides a natural ramp current riding on a DC level which can be used for control. The current in L2 is sensed and is converted into a voltage in a tran-impedance block 20.

It will be appreciated from the embodiments described above that the reason for using the delay elements is to prevent cross conduction of MOSFETS, but such delay elements are optional and can be implemented in an adaptive or non-adaptive fashion.

It will also be appreciated that for example the driver 9 as illustrated in FIG. 2 is optional and will only be required, if, for example, the switch S2b is a controllable switch and not, for example, a diode.

It will also be appreciated that unlike the previous attempts to solve this problem the primary current IP peaks at the end of the main power cycle at time t2 as shown in FIG. 3. This means that despite the existence of one or more auxiliary outputs, the main output Vo1 can still be regulated using primary peak current mode control.

It will also be appreciated by those skilled in the art that the invention can be applied to a wide variety of applications. It can be used in both single-ended and double-ended rectification applications regardless of the type and arrangement of rectifiers used in the main output. It will also be appreciated that, for example, the diodes in the main circuit can be replaced by synchronous rectifiers to boost the power conversion efficiencies and further instead of MOSFETS, the diodes can be used.

It will be appreciated that although the invention is ideally suited for peak current mode control any other control mode, for example, voltage mode control, charge control, etc. could be used.

It will also be appreciated that the control mode of the post regulation control circuit could be easily changed to current mode control resulting in improved dynamic performance.

It will further be appreciated that the detection of the end of the power cycle can be achieved in a variety of ways, and at various circuit nodes.

Further it will be appreciated that while it is preferable to deal with linear ramps, any other monotonous shape, for example exponential, could equally well be used. Similarly this applies to the direction of the ramp slope. In some situations, such as, for example, current mode control a negative ramp slope might be desirable. After voltage Vramp reaches voltage Vcomp the flip-flop could be set and for the rest of this switching interval the ramp signal would no longer be required. Thus the ramp signal can be reset anytime between this event and the end of the main power cycle.

It will also be appreciated by those skilled in the art that if the ramp signal is a continuous signal initialised only by the synchronous pulse generator the flip-flop 5 as, for example, in the circuit of FIG. 2 is not required in low-noise environments and would thus be optional. For example, the output of the comparator 4 in the circuit of FIG. 2 could be fed into the delay element 6, and inverted into the delay element 8. However, it will be appreciated that the flip-flop 5 improves the performance of the post regulation control circuit in noisy environments.

It will also be appreciated that any arbitrary number of closely regulated auxiliary outputs can be added to the main output.

In the specification the terms "comprise, comprises, comprised and comprising" or any variation thereof and the terms "include, includes, included and including" or any variation thereof are considered to be totally interchangeable and they should all be afforded the widest possible interpretation and vice versa.

The invention is not limited to the embodiments hereinbefore described, but may be varied in both construction and detail.

What is claimed is:

1. A post regulation control circuit for a switch mode power supply having power and freewheeling cycles and having a main output and a secondary output of a phase modulation type for trailing edge synchronisation comprising:

a comparator for comparing an output voltage of a secondary output to a reference voltage to provide a comparison voltage:

a triggering mechanism for a ramp generator;

means for detecting the end of a power cycle operatively connected to the triggering mechanism to cause the triggering mechanism to operate;

ramp generator means for providing a steadily changing voltage during the freewheeling cycle in response to the triggering mechanism; and a switch assembly for causing the correct voltage to be applied to the secondary output when the ramp voltage and comparison voltage are equal during the power cycle.

2. A post regulation control circuit as claimed in claim 1 in which the triggering mechanism is a synchronous pulse generator with means to detect the end of the power cycle.

3. A post regulation control circuit as claimed in claim 1 in which the ramp generator resets between the end of one power cycle and beginning of the next.

4. A post regulation control circuit as claimed in claim 2 in which the ramp generator resets between the end of one power cycle and beginning of the next.

5. A post regulation control circuit as claimed in claim 1 in which the ramp generator resets at the end of the power cycle.

6. A post regulation control circuit as claimed in claim 2 in which the ramp generator resets at the end of the power cycle.

7. A post regulation control circuit for a switch mode power supply using current mode control having power and freewheeling cycles and having a main output and a secondary output of the phase modulation type with trailing edge synchronisation comprising:
- a comparator for comparing the output voltage to a reference voltage to provide a comparison voltage;
- a triggering mechanism for a ramp generator;
- means for detecting the end of a power cycle operatively connected to the triggering mechanism to cause the triggering mechanism to operate;
- ramp generator means for providing a steadily changing voltage derived from the load current during the freewheeling cycle in response to the triggering mechanism; and
- a switch assembly for causing the correct voltage to be applied to the secondary output when the ramp voltage and comparison voltage are equal during the power cycle.

8. A post regulation control circuit as claimed in claim 7 in which the triggering mechanism is a synchronous pulse generator with means to detect the end of the power cycle.

9. A post regulation control circuit as claimed in claim 7 in which the ramp generator resets between the end of one power cycle and beginning of the next.

10. A post regulation control circuit as claimed in claim 8 in which the ramp generator resets between the end of one power cycle and beginning of the next.

11. A post regulation control circuit as claimed in claim 7 in which the ramp generator resets at the end of the power cycle.

12. A post regulation control circuit as claimed in claim 8 in which the ramp generator resets at the end of the power cycle.

13. A switch mode power supply converter comprising:
- a power input;
- a controller to control the power cycles connected to the power input;
- a transformer having primary and secondary windings fed by the controller through its primary winding;
- rectifying and filtering elements fed by the secondary winding of the transformer;
- an output load fed by the rectifying and filtering elements;
- a feedback loop from the output to the controller; and
- a post regulation control circuit comprising:
  - a comparator for comparing the output voltage to a reference voltage to provide a comparison voltage;
  - a triggering mechanism for a ramp generator;
  - means for detecting the end of a power cycle operatively connected to the triggering mechanism to cause the triggering mechanism to operate;
  - a ramp generator means for providing a steadily changing voltage during the freewheeling in response to the triggering mechanism; and
  - a switch assembly for causing the correct voltage to be applied to the secondary output when the ramp voltage and comparison voltage are equal during the power cycle.

14. A switch mode power supply converter as claimed in claim 13 in which the triggering mechanism is a synchronous pulse generator with means to detect the end of the power cycle.

15. A switch mode power supply converter as claimed in claim 13 in which the ramp generator resets between the end of one power cycle and beginning of the next.

16. A switch mode power supply converter as claimed in claim 14 in which the ramp generator resets between the end of one power cycle and beginning of the next.

17. A switch mode power supply converter as claimed in claim 13 in which the ramp generator resets at the end of the power cycle.

18. A switch mode power supply converter as claimed in claim 14 in which the ramp generator resets at the end of the power cycle.

19. A switch mode power supply converter using current mode control comprising:
- a power input;
- a controller to control the power cycles connected to the power input;
- a transformer having primary and secondary windings fed by the controller through its primary winding;
- rectifying and filtering elements fed by the secondary winding of the transformer;
- an output load fed by the rectifying and filtering elements;
- a feedback loop from the output to the controller; and
- a post regulation control circuit comprising:
  - a comparator for comparing the output voltage to a reference voltage to provide a comparison voltage;
  - a triggering mechanism for a ramp generator;
  - means for detecting the end cycle of a power cycle operatively connected to the triggering mechanism to cause the triggering mechanism to operate;
  - ramp generator means for providing a steadily changing voltage derived from the load current during the freewheeling cycle in response for the triggering mechanism; and
  - a switch assembly for causing the corrected voltage to be applied to the secondary output when the ramp voltage and comparison voltage are equal during the power cycle.

20. A switch mode power supply converter as claimed in claim 19 in which the triggering mechanism is a synchronous pulse generator with means to detect the end of the power cycle.

21. A switch mode power supply converter as claimed in claim 19 in which the ramp generator resets between the end of one power cycle and beginning of the next.

22. A switch mode power supply converter as claimed in claim 20 in which the ramp generator resets between the end of one power cycle and beginning of the next.

23. A switch mode power supply converter as claimed in claim 19 in which the ramp generator resets at the end of the power cycle.

24. A switch mode power supply converter as claimed in claim 20 in which the ramp generator resets at the end of the power cycle.

* * * * *